(12) United States Patent
Kim et al.

(10) Patent No.: US 7,508,037 B2
(45) Date of Patent: Mar. 24, 2009

(54) POLYCRYSTALLINE SILICON LIQUID CRYSTAL DISPLAY DEVICE AND FABRICATION METHOD THEREOF

(75) Inventors: San-Ho Kim, Chungcheongnam-Do (KR); Hoon-Ju Chung, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 26 days.

(21) Appl. No.: 11/508,948

(22) Filed: Aug. 24, 2006

(65) Prior Publication Data

US 2006/0286727 A1     Dec. 21, 2006

Related U.S. Application Data

(62) Division of application No. 10/876,629, filed on Jun. 28, 2004, now Pat. No. 7,112,476.

(30) Foreign Application Priority Data

Nov. 3, 2003     (KR) ................................ 2003-77367

(51) Int. Cl.
*H01L 27/00* (2006.01)
(52) U.S. Cl. ...................................... 257/347; 438/155
(58) Field of Classification Search ................. 257/347, 257/E21.413, E29.151, E29.273; 438/155, 438/151
See application file for complete search history.

(56) References Cited

U.S. PATENT DOCUMENTS

2002/0039813 A1 *   4/2002   Yamazaki ................... 438/151

\* cited by examiner

*Primary Examiner*—Leonardo Andújar
*Assistant Examiner*—Tucker Wright
(74) *Attorney, Agent, or Firm*—McKenna Long & Aldridge LLP

(57) ABSTRACT

A method for fabricating a poly-silicon liquid crystal display device includes forming a poly-silicon layer including a TFT region and a storage capacitor region on a substrate, wherein the capacitor region includes an impurity injection region having a N-type impurity injection region and a P-type impurity injection region; forming a gate electrode and a storage capacitor electrode on the poly-silicon layer; injecting an N-type impurity ion with a high doping density into the N-type impurity injection region and the TFT region; injecting a P-type impurity ion with a high doping density into the P-type impurity injection region; forming an insulating layer on the gate electrode and the storage electrode; and forming a pixel electrode on the insulating layer, wherein the pixel electrode is electrically connected to the impurity injection region in the storage capacitor region. Because the number of masks used for forming the storage capacitor is reduced, the fabricating process of a poly-silicon liquid crystal display device can be simplified.

7 Claims, 11 Drawing Sheets

P MOS

N MOS

N MOS

POLYCRYSTALLINE SILICON LIQUID CRYSTAL DISPLAY DEVICE AND FABRICATION METHOD THEREOF

This application is a Divisional of prior application Ser. No. 10/876,629, filed Jun. 28, 2004 now U.S. Pat. No. 7,112,476.

This application claims the benefit of Korean Patent Application No. 2003-77367, filed on Nov. 3, 2003, which is hereby incorporated by reference for all purposes as if fully set forth herein.

BACKGROUND OF THE INVENTION

1. Field of the Invention

The present invention relates to a poly-silicon liquid crystal display (LCD) device and a method for fabricating the same. More particularly, the present invention relates to a method for fabricating a poly-silicon LCD device having a capacitor that reduces the number of masks.

2. Description of the Related Art

In general, a liquid crystal display (LCD) device, for example, has a display unit for displaying images and a driving circuit unit for driving the display unit, wherein the display unit and the driving circuit unit are connected to each other by a tape carrier package (TCP). Alternatively, a LCD device integrated with driving circuits (hereinafter "integrated-type LCD device") has a display unit and a driving circuit unit, wherein the display unit and the driving circuit unit are formed on the same substrate.

Accordingly, the integrated-type LCD device can be more easily fabricated than the general LCD device. For the integrated-type LCD device, poly-silicon is commonly used as an active layer, since poly-silicon has better carrier mobility than amorphous silicon. Thus, the integrated-type LCD with poly-silicon transistors can operate at a high speed. For example, a carrier mobility of an amorphous thin film transistor (TFT) is 0.1~1 cm$^2$/Vsec, while a carrier mobility of a poly-silicon TFT formed by an excimer laser exceeds 100 cm$^2$/Vsec.

The integrated-type LCD device will now be described with reference to FIG. 1.

FIG. 1 is a schematic plan view of a poly-silicon LCD device according to a related art. Referring to FIG. 1, an integrated-type LCD device includes a display unit 101 having pixels arranged in a matrix configuration and a driving circuit unit 102 arranged along an outer periphery of the display unit 101 for driving the display unit. The driving circuit unit 102 further includes a gate driver 104 and a data driver 103. The display unit 101 and the driving circuit unit 102 are formed on the same substrate. In the driving circuit unit 102, complementary metal oxide semiconductor (CMOS) devices having P-type TFTs and N-type TFTs drive the pixels of the display unit.

The switching devices may be formed by a silicon on glass (SOG) method which uses a poly-silicon layer grown on a substrate as a channel layer. The P-type TFT and the N-type TFT have the same structure, and but they are different in types of ions injected into the poly-silicon layer.

The structure and fabrication process of the poly-silicon LCD device will now be described, for which a P-type TFT fabrication process is taken as an example.

Each pixel includes a TFT as a switching device for driving a pixel and a capacitor for storing a data signal. FIG. 2 is a sectional view illustrating a structure of a poly-silicon TFT having a capacitor according to a related art. Referring to FIG. 2, a poly-silicon layer 202 is used as an active layer 202a of a P-type TFT, and is also used as an electrode 202b of a storage capacitor. A gate insulating layer 203 is on the poly-silicon layer 202, and a gate metal 205 is formed on the gate insulating layer 203. A gate electrode 205a and a storage capacitor electrode 205b are formed by patterning the gate metal 205 by a photolithography process. An interlayer insulator 206 is formed on the gate electrode 205a and the storage capacitor electrode 205b, and a contact hole 210 for connecting source/drain electrodes 207 and 208 to the active layer is formed through the interlayer insulator 206 and the gate insulating layer 203. The source/drain electrodes 207 and 208 contact the active layer 202a through the contact hole 210. A passivation layer 209 is formed on the resultant structure in order to protect the TFT.

A fabrication process of the poly-silicon liquid crystal display device (LCD) will now be described with reference to FIGS. 3A to 3E.

As shown in FIG. 3A, an amorphous silicon layer is formed on a substrate 301 by a Plasma Enhanced Chemical Vapor Deposition (PECVD) method. In order to transform the amorphous silicon layer to a poly-silicon layer, the amorphous silicon layer undergoes a heat treatment at a high temperature in a furnace or by a laser annealing. With the heat treatment and a photolithography process, the amorphous silicon layer becomes a poly-silicon layer 302, which includes a TFT region 302a and a storage capacitor region 302b.

In order to use the storage capacitor region 302b of the poly-silicon layer as one of the electrodes of a storage capacitor, the storage capacitor region 302b is highly doped with impurity ions. FIG. 3B illustrates a doping process (metallizing) in which P+ ions are injected into the storage capacitor region 302b. Referring to FIG. 3B, after the poly-silicon layer is formed on the substrate 301, the TFT region 302a is covered by a photo-resist 304, and the storage capacitor region 302b is exposed for the doping process. Accordingly, a masking process is required in order to form the storage capacitor region 302b according to the related art.

Next, as shown in FIG. 3C, a gate insulating layer 303 is formed on the poly-silicon layer 302, and a gate electrode 305a and an electrode 305b of the storage capacitor are formed on the gate insulating layer 303. The gate electrode 305a and the electrode 305b of the storage capacitor are formed of the same metal layer. Thus, the storage capacitor has the storage capacitor region 302b, which is a doped poly-silicon layer, and the electrode 305b as storage capacitor electrodes, and the gate insulation layer 303 as a dielectric layer.

After forming the gate electrode 305a, source and drain regions are formed by injecting p-type impurity ions such as boron into the poly-silicon layer using the gate electrode 305a as a mask, as shown in FIG. 3D.

Next, as shown in FIG. 3E, an interlayer insulator 306 of silicon nitride or silicon oxide is formed on the gate electrode 305a, and a contact hole 310 is formed. Then, a conductive layer is deposited in the contact hole 310 and on the interlayer insulator 306, and is then patterned to form source/drain electrodes 307 and 308. Thus, the source/drain electrodes 307 and 308 contact the source and drain regions through the contact hole 310. After forming the source/drain electrodes, a passivation film 309 is formed on the entire surface of the substrate to protect the source/drain electrode from an external environment, to thereby complete the formation of a P-type poly-silicon TFT having a storage capacitor.

In the fabrication method described above, the step of forming one of the storage capacitor electrodes using a poly-silicon layer will be described in more detail with reference to FIG. 4A to 4C.

As shown in FIG. 4A, a poly-silicon layer 401 having a predetermined pattern is formed on a substrate. The poly-silicon layer 401 is formed by depositing an amorphous silicon layer on the substrate, by crystallizing the amorphous silicon layer using a heat treatment, and by patterning the crystallized silicon layer. The poly-silicon layer will be used as an active layer of a TFT and as one of the electrodes of a storage capacitor. In order to use the poly-silicon layer 401 as an electrode of the storage capacitor, the portion of the poly-silicon layer corresponding to the electrode of the storage capacitor (storage capacitor region) needs to be metalized.

FIG. 4B illustrates a process of metalizing the storage capacitor region. Referring to FIG. 4B, a mask 403 covers the poly-silicon layer including a TFT region 401a except for the storage capacitor region 401b. Then, impurity ions are injected into the storage capacitor region 401b. A photo-resist is used as the mask 403. Therefore, the process of metalizing the storage capacitor region 401b includes coating a photo-resist on the poly-silicon layer; exposing the storage capacitor region 401b using a photo-mask; developing the photo-resist; injecting impurity ions; and removing the photo-resist.

Subsequently, after a gate insulating layer is formed on the poly-silicon layer, a metal layer is formed to form a gate electrode 404 and a storage capacitor electrode 405 by a photolithography process, as shown in FIG. 4C. After the gate electrode 404 and the storage capacitor electrode 405 are formed, follow-up processes proceed to form a TFT as described above with reference to FIGS. 3D and 3E.

As stated above, the liquid crystal display device using the poly-silicon layer as an electrode of the storage capacitor is disadvantageous in that an additional photo-mask process is required to metalize the poly-silicon layer of the storage capacitor region.

SUMMARY OF THE INVENTION

Accordingly, the present invention is directed to a liquid crystal display (LCD) device and a method for fabricating the same that substantially obviate one or more of the problems due to limitations and disadvantages of the related art.

An advantage of the present invention is to provide a liquid crystal display (LCD) device that uses a poly-silicon layer as an electrode of a storage capacitor and a method for fabricating the same that reduce the number of masks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method for fabricating a poly-silicon liquid crystal display device includes: forming a poly-silicon layer including a TFT region and a storage capacitor region on a substrate, wherein the capacitor region includes an impurity injection region having a N-type impurity injection region and a P-type impurity injection region; forming a gate electrode and a storage capacitor electrode on the poly-silicon layer; injecting an N-type impurity ion with a high doping density into the N-type impurity injection region and the TFT region; injecting a P-type impurity ion with a high doping density into the P-type impurity injection region; forming an insulating layer on the gate electrode and the storage electrode; and forming a pixel electrode on the insulating layer, wherein the pixel electrode is electrically connected to the impurity injection region in the storage capacitor region.

In another aspect of the present invention, a poly-silicon liquid crystal display device includes a poly-silicon layer having a TFT region and a storage capacitor region, wherein the storage capacitor region includes an impurity injection region having an N-type impurity injection region and a P-type impurity injection region; a gate electrode and a capacitor electrode on the poly-silicon layer; an insulating layer on the gate electrode and a capacitor electrode; a passivation layer on the insulating layer; a pixel electrode on the passivation layer; and a conductive layer for electrically connecting the impurity injection region to the pixel electrode.

In yet anther aspect of the present invention, a poly-silicon liquid crystal display device includes a poly-silicon layer including a TFT region and a storage capacitor region, wherein the storage capacitor region includes an impurity injection region having an N-type impurity injection region and a P-type impurity injection region; a first insulating layer on the TFT region and the storage capacitor region; a gate electrode and a capacitor electrode on the first insulating layer; a second insulating layer on the gate electrode and the capacitor electrode; a passivation layer formed on the second insulating layer; a contact hole passing through the first insulating layer, the second insulating layer, and the passivation layer to expose the impurity injection region; and a pixel electrode on the passivation layer and electrically connected to the impurity injection region through the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

A poly-silicon liquid crystal display device and a method for fabricating the same according to an embodiment of the present invention will now be described with reference to FIGS. 5A to 5F and 6A to 6D.

The poly-silicon liquid crystal display device includes a display unit on which plurality of pixels are arranged in a matrix form and a driving unit having P-type TFTs and N-type TFTs for driving the pixels.

The liquid crystal display device has a plurality of TFTs. For explanation purposes, a process of forming one TFT will now be described with reference to FIGS. 5A to 5F.

FIG. 5A to 5F illustrate a process of fabricating one TFT used for a poly-silicon liquid crystal display device.

Figure 1:
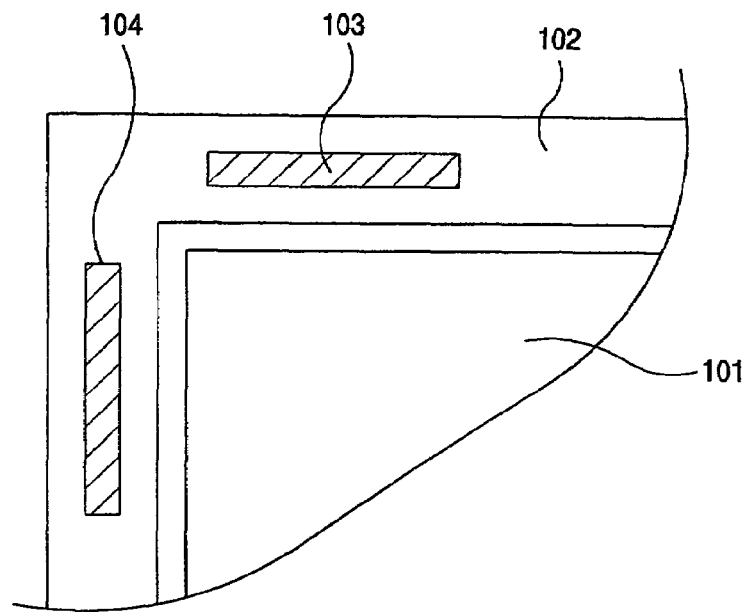
FIG. 1 is a sectional view illustrating a liquid crystal display device integrated with driving circuits.
Figure 2:
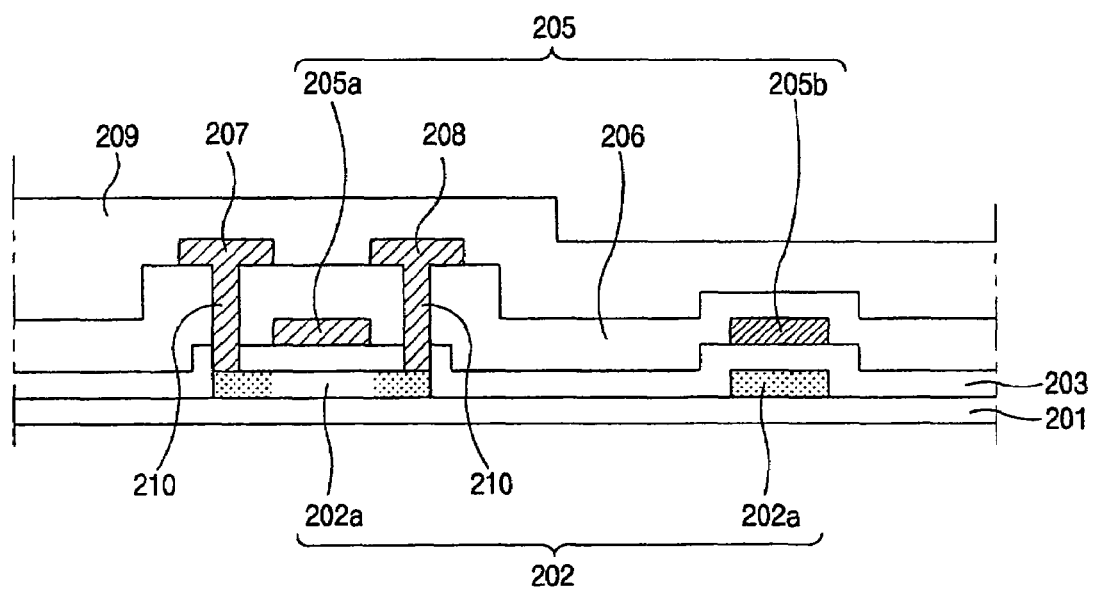
FIG. 2 is a sectional view illustrating a structure of a poly-silicon thin film transistor according to a related art.
Figure 3A:
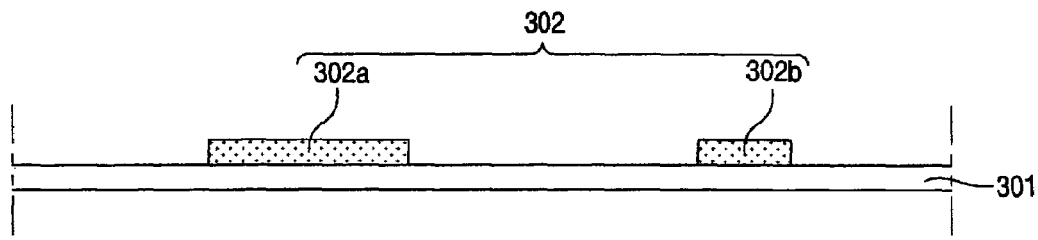
FIGS. 3A to 3E show sequential processes of fabricating the poly-silicon thin film transistor in accordance with the related art.
Figure 3B:
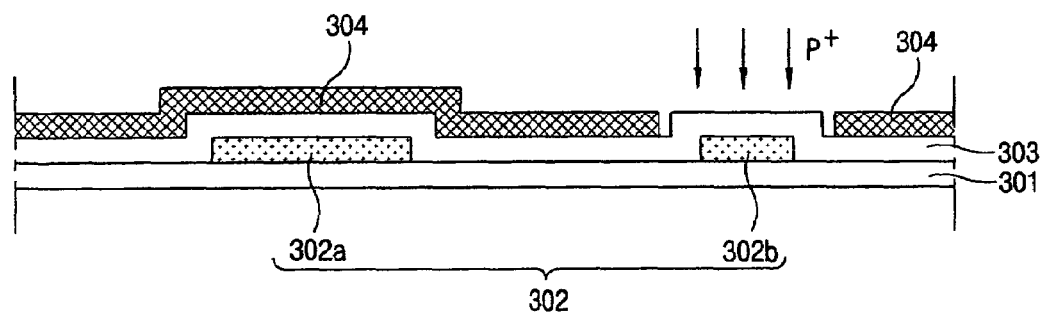
Figure 3C:
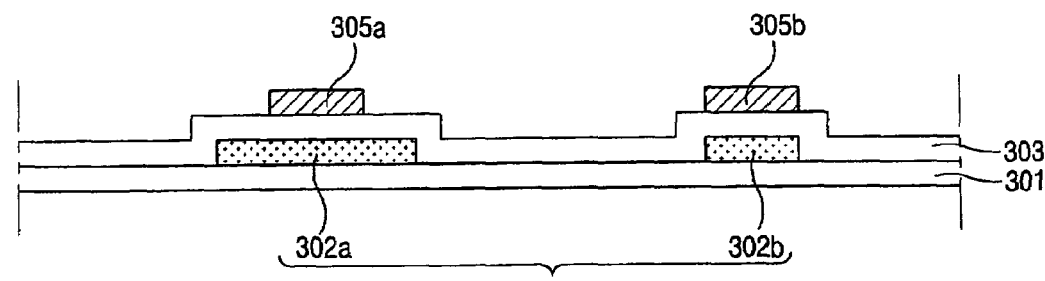
Figure 3D:
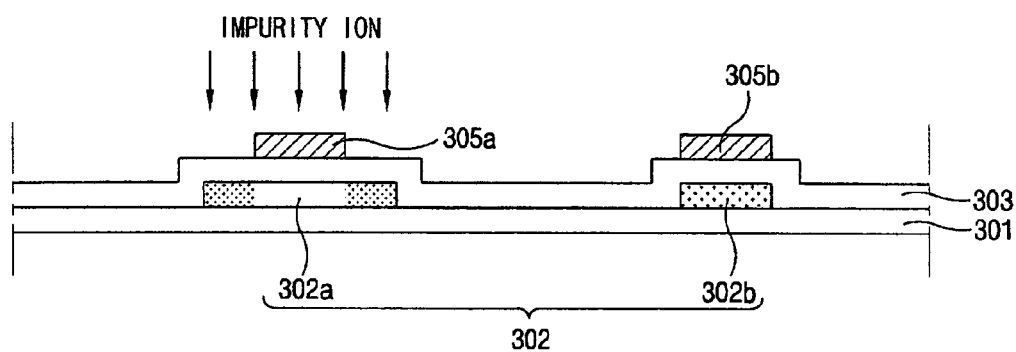
Figure 3E:
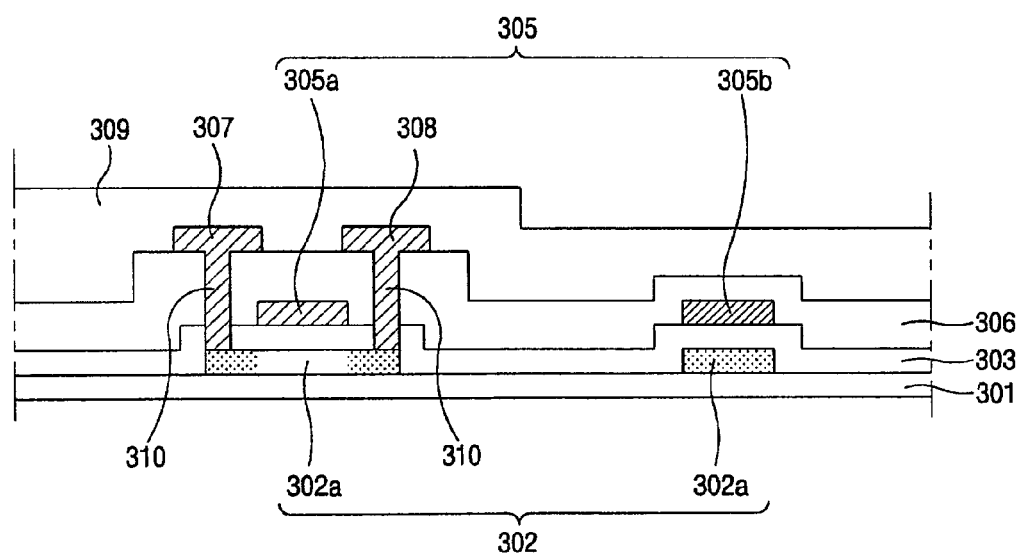
Figure 4A:
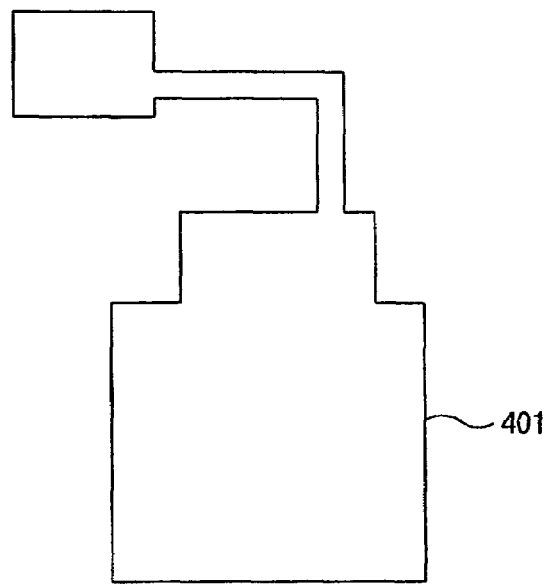
FIGS. 4A to 4C show sequential processes of forming a capacitor electrode in the fabricating processes of the poly-silicon thin film transistor in accordance with the related art.
Figure 4B:
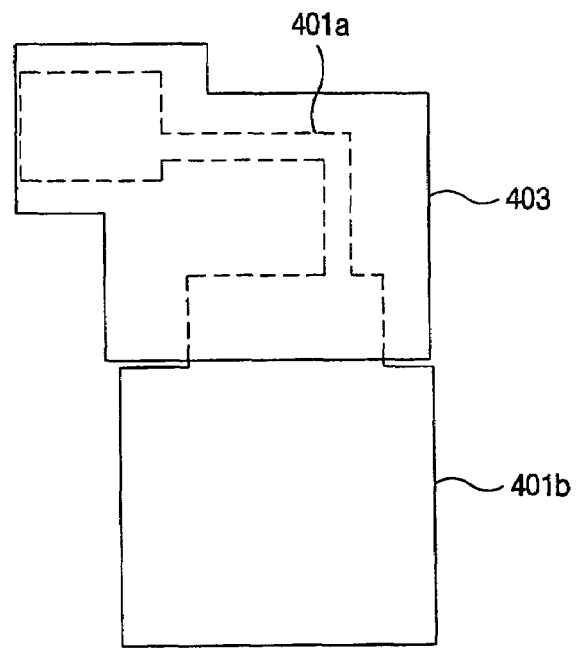
Figure 4C:
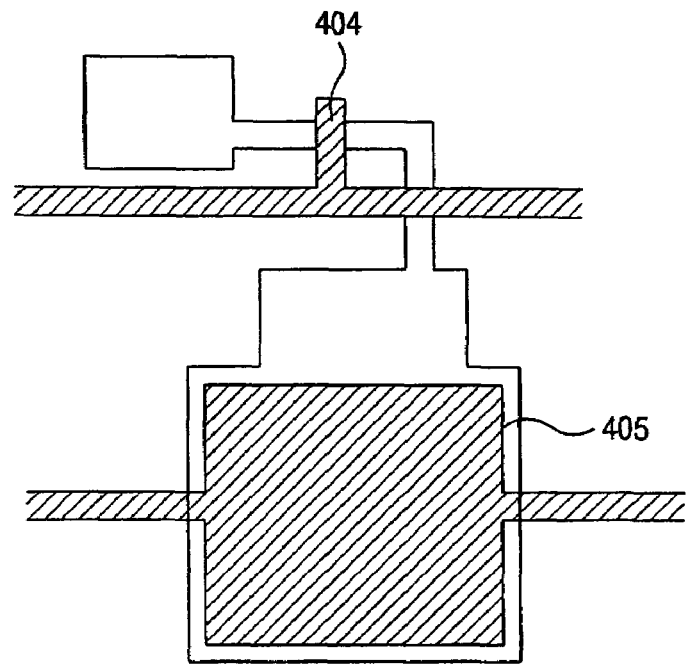
Figure 5A:
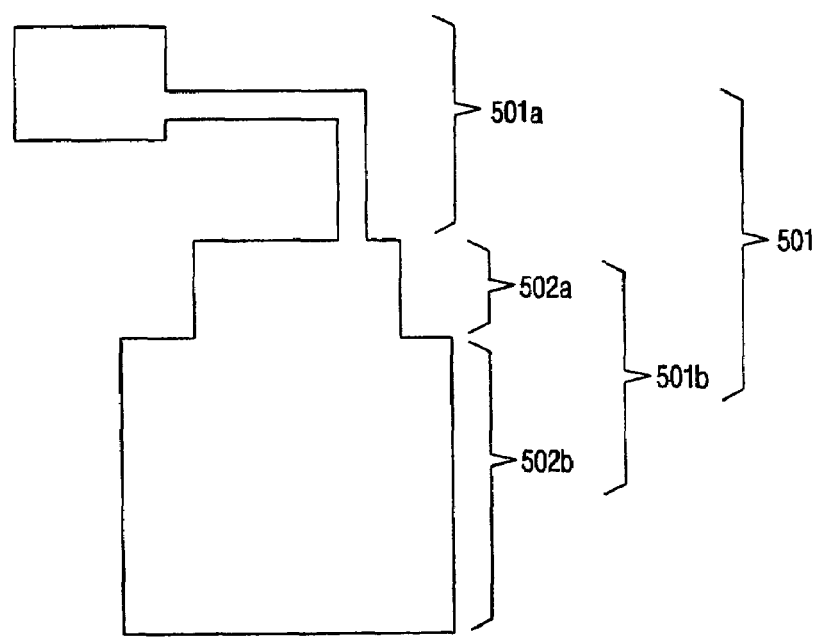
FIGS. 5A to 5E are sequential processes of forming a gate line and a capacitor electrode in the fabricating processes of a poly-silicon thin film transistor according to an embodiment of the present invention.

As shown in FIG. 5A, in order to form a TFT, a silicon layer is formed on a substrate, and is patterned to form a poly-silicon layer 501 with a predetermined pattern. The poly-silicon layer 501 includes a TFT element region 501a and a storage capacitor region 501b. The storage capacitor region 501b is divided into an impurity injection region 502a and a capacitor electrode region 502b. The impurity injection region 502a may be formed at a certain portion of the storage capacitor region 501b.

To form the poly-silicon layer 501, an amorphous silicon layer is formed on the substrate by a PECVD method, and is then crystallized using a heat treatment.

Silicon particles are randomly arranged in the amorphous silicon layer. When the silicon particles are annealed, crystals start to grow from seeds, and the amorphous silicon transforms to a poly-silicon. The poly-silicon layer has a large number of grains, each of which is a single crystal, and the grains are in contact with one another with grain boundaries therebetween.

The smaller the area of the grain boundaries, the higher the moving speed of carriers such as electrons or holes. This is because the grain boundaries act as a barrier when carriers moves in the poly-silicon layer. If the size of the grains is large, the area of the grain boundaries becomes smaller, and thus, the mobility of the carriers becomes higher.

In general, when a LCD device uses a glass substrate, it is undesirable to crystallize an amorphous silicon layer formed on the glass substrate to a poly-silicon layer by a heat treatment at a high temperature in a furnace. This is because the glass substrate deforms at about 600° C. or higher. Therefore, according to an embodiment of the present invention, a laser annealing method is used to crystallize the amorphous silicon layer. For the laser annealing method, a laser available for an instant heating at a high temperature is irradiated on the amorphous silicon layer formed on the substrate to crystallize the amorphous silicon. In this way, the silicon layer can be crystallized without deforming the glass substrate by the laser annealing.

For the LCD devices having poly-silicon TFTs, a laser for the crystallization may have an energy to completely melt the amorphous silicon layer, and then, the channel layer of the poly-silicon TFTs may be constructed by a sequential lateral solidification (SLS) method for inducing a lateral solidification to minimize the grain boundary areas. The poly-silicon TFTs formed by this SLS method have, in general, better transistor characteristics.

A laser annealing method including the SLS method and a heat treatment have been described for a method to crystallize an amorphous silicon layer to a poly-silicon layer. However, it should be understood that other methods can be used for the crystallization, so long as it can transform an amorphous silicon layer into a poly-silicon layer according to the principles of the present invention.

Though not shown, after the poly-silicon layer is formed on the substrate, a gate insulating layer of silicon oxide ($SiO_2$) may be formed on the poly-silicon layer to insulate the gate electrode and the poly-silicon layer. The gate insulating layer may be formed by a PECVD method.

Figure 5B:
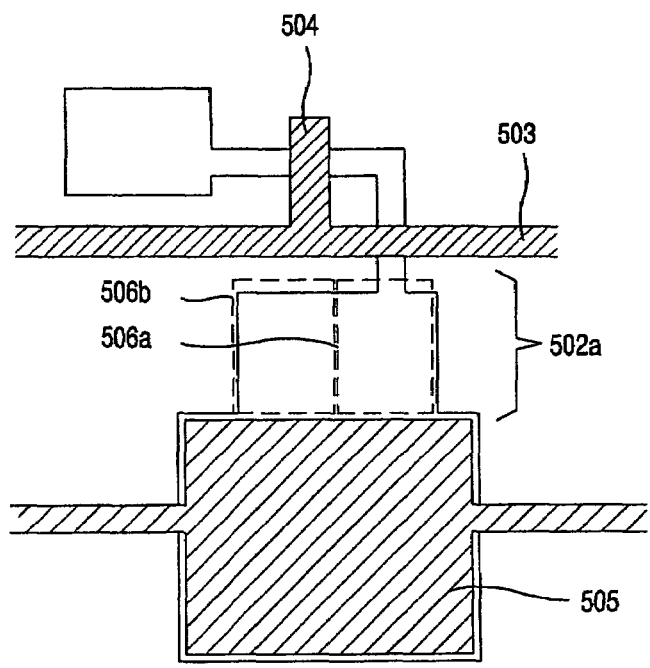

After the gate insulating layer is formed on the substrate, as shown in FIG. 5B, a gate line 503 and a gate electrode 504 are formed at the TFT region 501a of the poly-silicon layer 501, and an electrode 505 of the storage capacitor is formed at the capacitor electrode region 502b. In FIG. 5B, the region where the gate electrode 504 overlaps the poly-silicon layer becomes the channel region of the TFT. When the storage capacitor electrode 505 is formed at the capacitor electrode region 502b, the rest portion of the storage capacitor region 501b remains as the impurity injection region 502a.

After the gate electrode 504 and the storage capacitor electrode 505 are formed, an impurity ion is injected into the impurity injection region 502a.

The impurity injection region 502a is divided into an N-type impurity injection region 506a and a P-type impurity injection region 506b. An N-type impurity with a high doping density is injected into the N-type impurity injection region 506a to form a N-type TFT. Alternatively, a P-type impurity with a high doping density is injected into the P-type impurity injection region 506b to form a P-type TFT. Thus, without using an additional mask to form the N-type impurity injection region 506a and the P-type impurity injection region 506b, the N-type impurity region 506a or the P type impurity region 506b can be formed by simply adding a pattern to the mask used in the process of forming the N type TFT or the P type TFT.

The above process will be described in more detail with reference to FIGS. 5C and 5D.

The poly-silicon liquid crystal display device uses a CMOS as an element for the driving circuit in the driving unit. A CMOS has a pair of an N-type TFT and a P-type TFT. Especially, the N-type TFT is generally fabricated as a TFT with a lightly doped drain (LDD) structure (hereinafter "LDD-type TFT) to prevent a leakage current due to so-called hot-carrier effect. In the LDD-type TFT, an impurity with a low doping density is injected into an active layer adjacent to a channel to form an LDD region, and an impurity of N-type with a high doping density is injected to the source and drain regions, which are outer edges of the LDD region. The injection process may proceed with forming the N-type TFT with a LDD structure followed by forming the P-type TFT.

First, the injection process for the N-type TFT with a LDD structure will be described with reference to FIG. 5C.

A N-type impurity ion with a low doping density is injected into the entire surface of the substrate having the gate electrode 504 and the storage capacitor electrode 505 of the storage capacitor. At this time, the gate electrode 504 in the TFT region 501 serves as a mask, preventing the N-type impurity from being injected into the channel area of the TFT. The impurity ion with a low doping density is also injected into the impurity ion injection region 502b of the storage capacitor as well as the P-type impurity injection region 506b.

However, the N-type impurity ion with a low doping density injected into the P-type impurity injection region 506b will be offset during a later injection process in which a P-type impurity ion with a high doping density is injected into the P-type impurity injection region 506b.

Figure 5C:
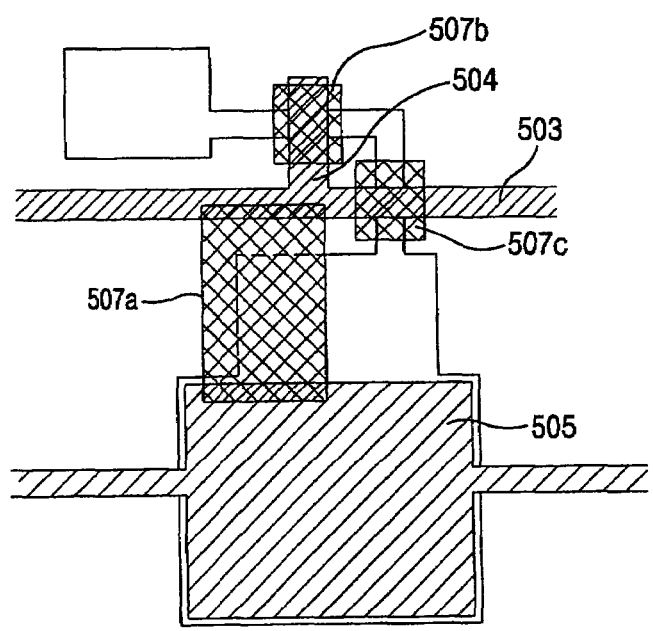

Subsequently, an N-type impurity ion with a high doping density is injected into the entire surface, with a photo resist pattern 507 covering the portion of the TFT region 501a and the P-type impurity injection region 506b, as shown in FIG 5C. As it is clear from FIG. 5C, the TFT that will be formed at the TFT region 501a after completing the fabricating process has a dual gate structure. The photo-resist pattern are divided into a first photo-resist pattern 507a, a second photo-resist pattern 507b, and a third photo-resist pattern 507c. The first photo resist pattern 507a is formed on the P type impurity injection region 506b, and the second and third photo-resist patterns are formed on the portions of the TFT regions in which the channel area and LDD region of the TFT will be formed. The photo-resist pattern 507a on the P-type impurity injection region 506b can be formed by simply adding a pattern to the mask that is used for the injection process for forming the N-type source and drain regions.

Next, an N-type impurity ion with a high doping density is injected to form the source and drain regions of the N-type TFT using a photo-resist as a mask. With this process, the N-type TFT with a LDD structure is formed at the N-type TFT region 501a, and the N-type impurity injection region 506a is highly doped with the N-type impurity.

Accordingly, the N-type TFT with a LDD structure is formed on the substrate, and a process for forming the P-type TFT is then performed.

To form the P-type TFT, a photo resist pattern 508 is formed on the TFT region and the N-type impurity injection region 506a, with the P-type impurity injection region 506b being exposed. Subsequently, a P-type impurity ion with a high doping density is injected to the P-type impurity injection region 506b. This process will now be described with reference to FIG. 5D.

Figure 5D:
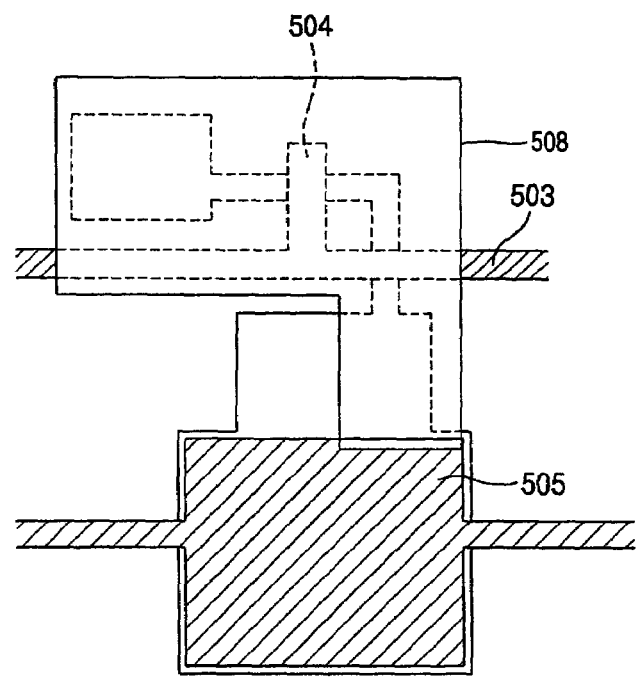

In this embodiment of the present invention, the P-type TFT is not shown in FIG. 5D, because descriptions are mainly focused on the formation of the N-type TFT. However, the P-type TFT also exists at a predetermined region of the substrate according to the present invention.

In order to inject a P-type impurity ion with a high doping density into the P type impurity injection region 506b and source/drain regions of the P-type TFT (not shown), the N-type TFT region is covered with a photo-resist including the photo-resist pattern 508, with the P-type impurity injection region 506b and the source/drain regions of the P-type TFT (not shown) being exposed. Then, the P-type impurity ion with a high doping density is injected to the P-type impurity injection region 506b and the source/drain regions of the P-type TFT (not shown).

As a result, the N-type and P-type impurity ions are injected into the impurity injection region 502a without using an additional mask.

Figure 5E:
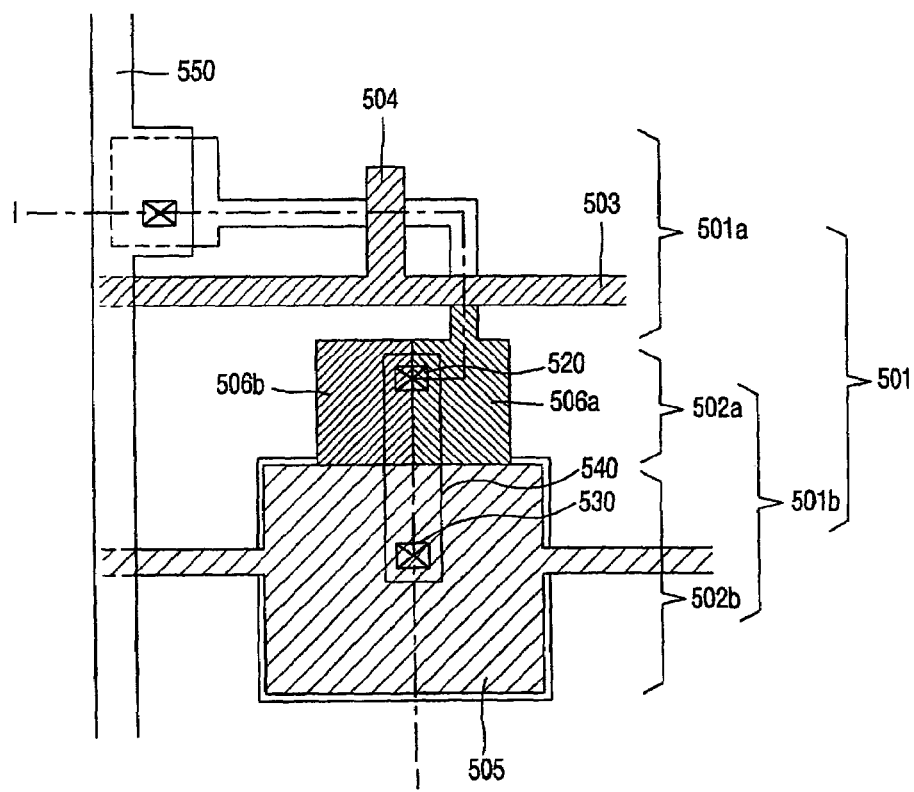

FIG. 5E shows an active layer including the impurity ion injection region 502a of the storage capacitor injected with the N-type and P-type impurity ions.

The impurity ion injection region 502a is connected to a pixel electrode (not shown) through a first contact hole 520 and a second contact hole 530 by means of an electrode material 540. The first contact hole 520 is connected to the impurity ion injection region 502a, and the second contact hole 530 is connected to the pixel electrode.

A fabrication process of a poly-silicon LCD device according to an embodiment of the present invention will now be described in more detail with reference to FIGS. 6A to 6F which show cross-sectional views taken along the line I-I' in FIG. 5E.

Figure 6A:
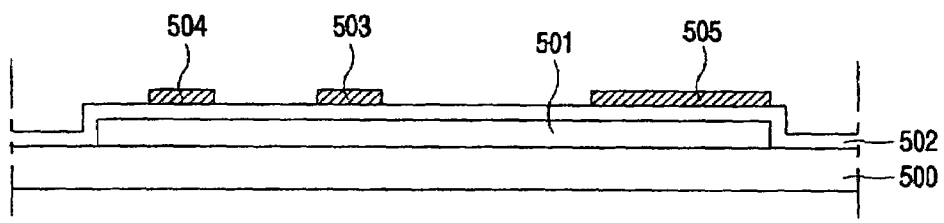
FIGS. 6A to 6F are sequential processes of fabricating a poly-silicon thin film transistor according to an embodiment of the present invention.

With reference to FIG. 6A, an amorphous silicon layer is formed on a substrate 500 and undergoes a heat treatment to form a poly-silicon layer. Next, the poly-silicon layer is patterned to form an active layer 501.

A gate insulating layer is formed on the active layer 501, for example, by a PECVD method, on which a gate metal is deposited. Thereafter, the gate metal is patterned to form the gate electrode 504, the gate line 503 and the storage electrode 505.

Figure 6B:
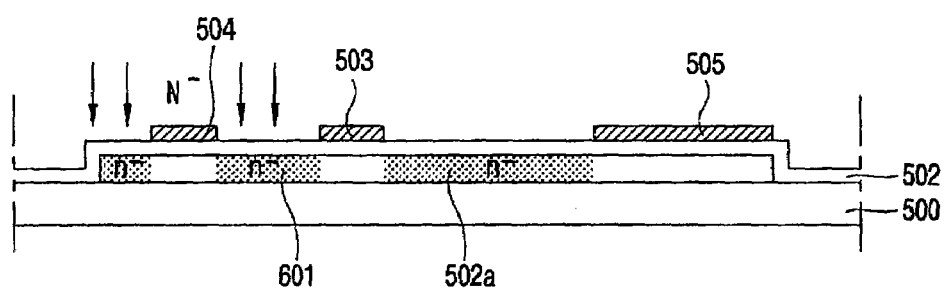

As shown in FIG. 6B, an N-type impurity ion with a low doping density is then injected into the entire surface of the substrate 500 on which the gate electrode 504, the gate line 503 and the storage electrode 505 have been formed. At this time, the gate electrode 504, the gate line 503 and the storage electrode 505 serve as a mask, so that the N-type impurity ion with a low doping density is injected into source/drain regions 601 and an impurity ion injection region 502a.

Figure 6C:
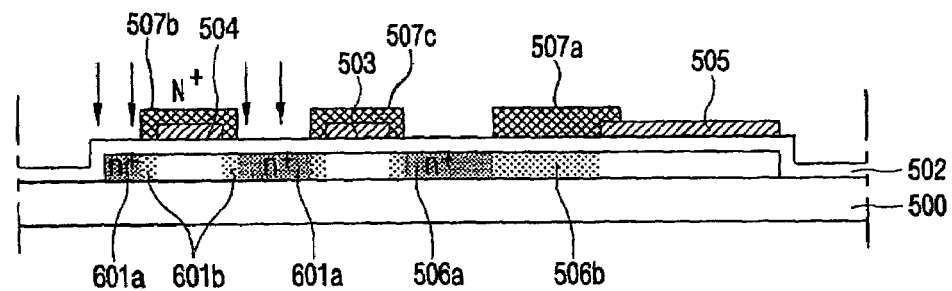

Referring to FIG. 6C, photo resist patterns 507a, 507b and 507c are subsequently formed on the substrate to inject an N-type impurity ion with a high doping density into an N-type impurity injection region 506a of the impurity ion injection region 502a and the portion of the source/drain regions 601a, which excludes the LDD region 601b, of the N-type TFT. The photo-resist patterns are used to block the N-type impurity ion with a high doping density. Next, an N-type impurity ion with a high doping density is injected into the TFT region 501a using the photo-resist patterns 507b and 507c as masks, so that an N-type TFT with a LDD structure is formed on the substrate 500.

At this time, the N-type impurity injection region 506a of the impurity-injection region 502a of the storage capacitor is highly doped with the N-type impurity ion, while the P-type impurity injection region 506b is covered by the photo resist pattern 507a and is only doped with the N-type impurity ion with a low doping density.

Figure 6D:
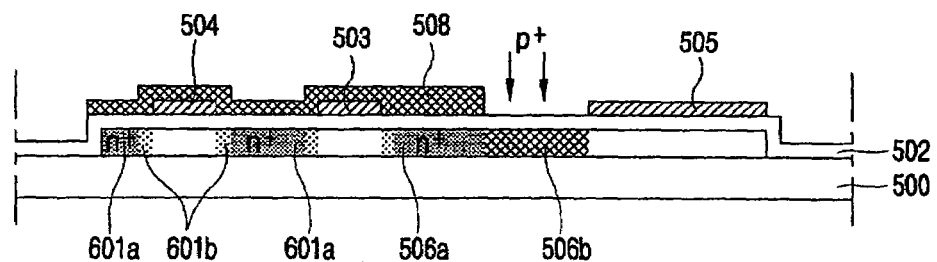

Next, as shown in FIG. 6D, another photo-resist pattern 508 is formed on the TFT region and N-type impurity injection region 506a, with the-P type impurity injection region 506b being exposed. When a P-type impurity ion with a high doping density is injected into the entire surface of the substrate with the photo-resist pattern 508, the P-type impurity injection region 506b of the storage capacitor is highly doped with the P-type impurity ion, offsetting the N-type impurity ion with a low doping density injected in a previous process.

Figure 6E:
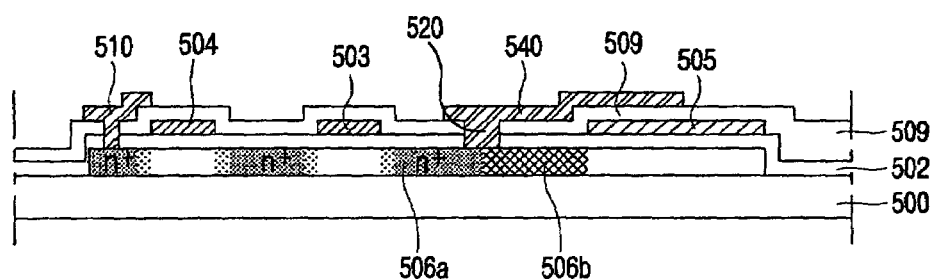

After the P-type and N-type impurity ions are injected into the impurity region of the capacitor, as shown in FIG. 6E, an insulation layer 509 made of, for example, silicon nitride or silicon oxide is formed on the entire surface of the substrate. Then, a source electrode 510 and an electrode material 540 is formed by depositing a metal layer and patterning the metal layer. The electrode material 540 serves as a drain electrode of the TFT and as a bridge that connects the impurity injection region with a pixel electrode. The electrode material 540 is connected to the impurity injection region through the first contact hole 520 and is connected to the pixel electrode (not shown) through the second contact hole, as shown in FIG. 5E.

Figure 6F:
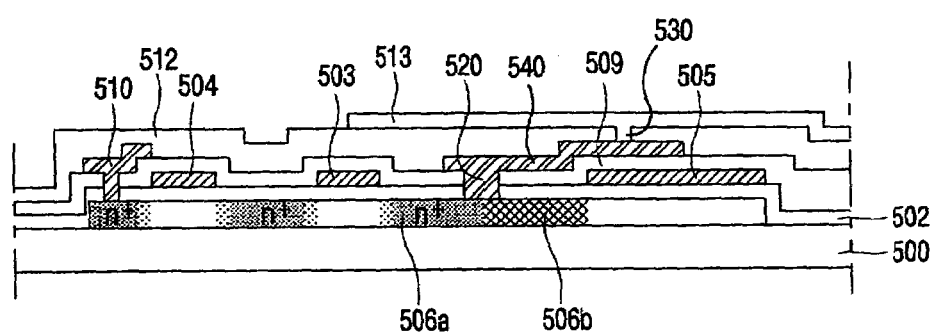

Referring to FIG. 6F, a passivation film 512 for planarization and protection is then formed on the entire surface of the substrate having the source electrode 510 and the electrode material 540.

Next, the second contact hole 530 is formed on the passivation film 512 to connect the electrode material 540 with the pixel electrode 513. Thereafter, the pixel electrode 513 made of a transparent conductor is formed on the substrate, thereby completing the formation of a switching device for driving the liquid crystal display device.

Figure 6G:
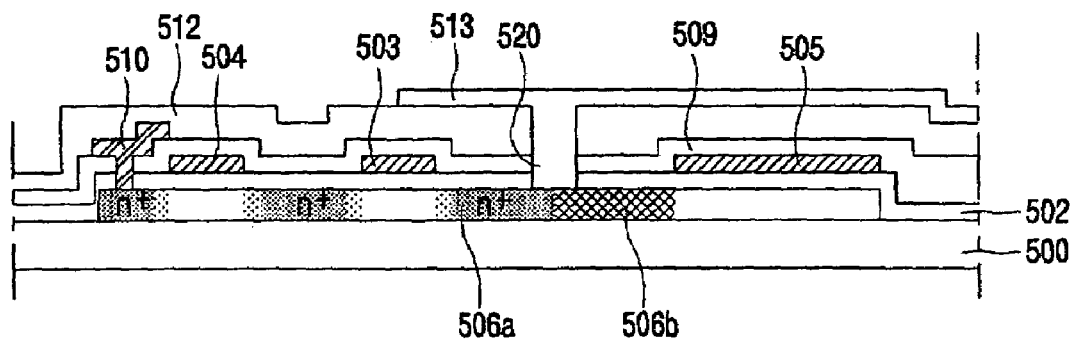
FIG. 6G is a sectional view illustrating a structure of a poly-silicon thin film transistor in accordance with a different embodiment of the present invention.

Alternatively, the pixel electrode 513 may be directly connected to the impurity injection region without the electrode material 540, as shown in FIG. 6G A CMOS having a pair of an N-type TFT and a P-type TFT is commonly used for driving circuits which require stable operation instead of high-speed operation. Thus, when the CMOS described above is formed in the driving unit of a LCD device, the pixel electrode may be unnecessary.

As described above, according to the present invention, highly doping the source/drain regions of the P-type TFT and the P-type impurity injection region 506b can be performed at the same time with one mask. Thus, the fabrication process according to the present invention reduces a number of masks, compared with the related art fabricating process.

Additionally, according to the present invention, one of the electrodes of the storage capacitor corresponding to the impurity ion injection region 502a has both the P-type impurity injection region 506b and the N-type impurity ion injection region 506a. The impurity ion injection region 502a can be formed at an arbitrary region of the storage capacitor region 501b, and serves as an electrode of the storage capacitor. This structure provides an additional advantage in an application of a poly-silicon LCD, which will be described below in more detail.

In a line inversion type liquid crystal display device in which a positive (+) voltage and a negative (−) voltage are alternately applied to the pixels, when the storage region is not doped with an impurity ion, the capacitance is not uniform. The reason is described with reference to FIGS. 7A to 7C.

Figure 7A:
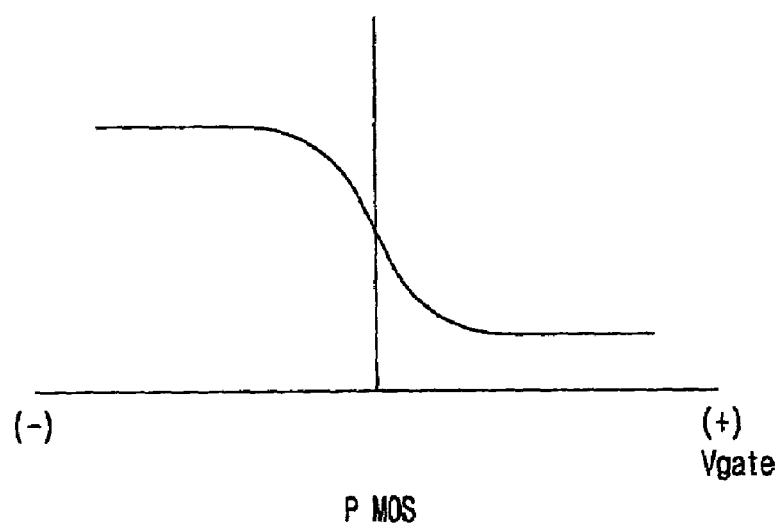
FIGS. 7A to 7C are graphs illustrating capacitance characteristics.
Figure 7B:
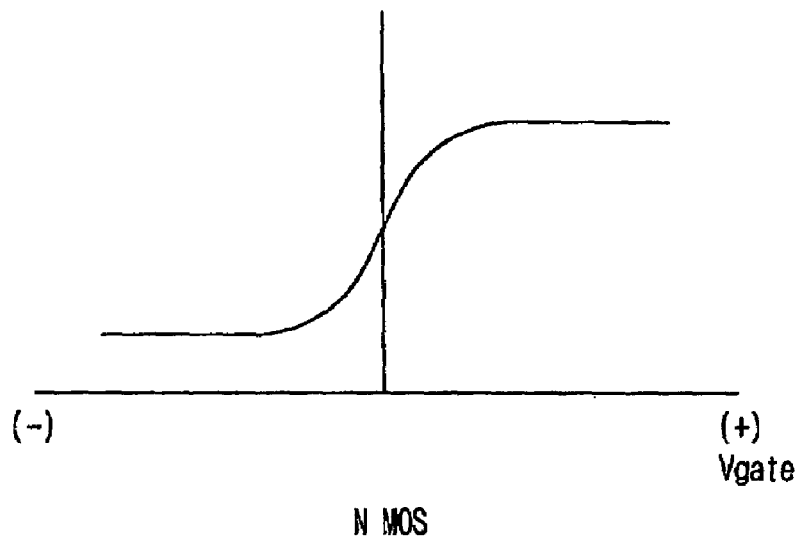
Figure 7C:
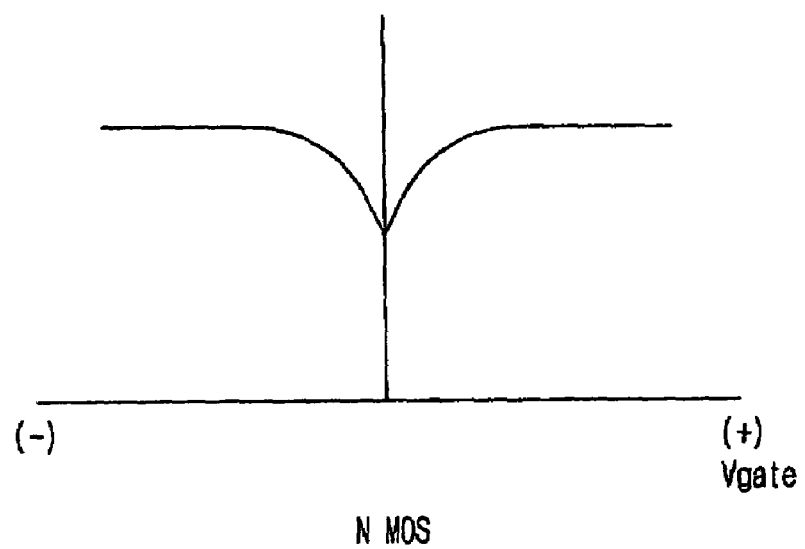

FIG. 7A to 7C are graphs showing the characteristics of a storage capacitor used in conjunction with an N-type TFT or a P-type TFT in a line inversion type liquid crystal display device.

In case of the N-type TFT, since a poly-silicon layer that is highly doped with an N-type impurity is used as one electrode of the storage capacitor, when a negative voltage is applied to the electrode of the storage capacitor, electrons, which are the majority carrier in the N-type TFT, are pushed downwardly in the poly-silicon layer. Then, the distance between the two electrodes of the storage capacitor increases, and the amount of the capacitance decreases. As $C = \in A/d$ (C: capacitance, $\in$: dielectric constant, 'A': area, and 'd': distance), the capacitance C is reduced. In contrast, when a positive (+) voltage is applied to the one electrode of the storage capacitor, which is formed of a highly doped poly-silicon layer, the distance 'd' decreases, and thus the capacitance C increases.

The same principle applies to the P-type TFT. Thus, in case of the P-type TFT in which holes are the majority carrier, when a positive (+) voltage is applied to the one electrode of the storage capacitor formed of a highly doped poly-silicon layer, the capacitance decrease, whereas when a negative (−) voltage is applied, the capacitance increases, as shown in FIGS. 7A and 7B.

In the embodiment of the present invention described above, one of the electrodes of the storage capacitor has both the N-type impurity injection region and the P-type impurity injection region, both of which are formed of a highly doped poly-silicon layer. Thus, even though the voltage is alternately applied in the line inversion type liquid crystal display device, the capacitance can be uniformly maintained.

In other words, when a positive (+) voltage is applied to one electrode of the capacitor, the impurity ions doped in the N-type impurity region of the storage capacitor are supplied to the poly-silicon layer, thereby maintaining a uniform capacitance, and when a negative (−) voltage is applied to one electrode of the capacitor, the impurity ions doped in the P-type impurity region of the storage capacitor are supplied to the poly-silicon layer, thereby maintaining a uniform capacitance. Thus, even though positive and negative voltages are alternately applied to the data lines, the capacitance of the storage capacitor can be maintained uniformly.

As described above, the present invention has the following advantages. Because a number of masks used for forming the storage capacitor is reduced, a fabricating process of a poly-silicon LCD device according to the present invention can be simplified. In addition, when a poly-silicon LCD device uses a line inversion method for driving the pixels, a capacitance of the storage capacitor in each pixel can be uniformly maintained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A poly-silicon liquid crystal display device comprising:
a poly-silicon layer having a TFT region and a storage capacitor region, wherein the storage capacitor region includes a capacitor electrode region and an impurity injection region having an N-type impurity injection region and a P-type impurity injection region;
a first insulating layer on the poly-silicon layer;
a gate electrode and a capacitor electrode on the first insulating layer;
a second insulating layer on the first insulating layer including the gate electrode and the a capacitor electrode;
a first contact hole formed in the second insulating layer and the first insulating layer to expose the N-type impurity injection region and the P-type impurity injection region of the polysilicon layer;
a conductive layer formed on the second insulating layer including the first contact hole and connected to the N-type impurity injection region and the P-type impurity injection region of the impurity injection region;
a passivation layer on the second insulating layer including the conductive layer;
a second contact hole formed in the passivation layer to expose the conductive layer; and
a pixel electrode on the passivation layer and electrically connected to the conductive layer thorough the second contact hole.

2. The device of claim 1, wherein the N-type impurity injection region has substantially the same area as the P-type impurity injection region.

3. The device of claim 1, wherein the N type impurity injection region and the P type impurity injection region are adjacent to each other.

4. The device of claim 1, wherein the impurity injection region is one electrode of the storage capacitor.

5. The device of claim 1, wherein the poly-crystalline silicon liquid crystal display device uses a line inversion method as a pixel driving method.

6. The device of claim 1, wherein the storage capacitor region is divided into a storage electrode region and an impurity injection region.

7. A poly-silicon liquid crystal display device comprising:
a poly-silicon layer including a TFT region and a storage capacitor region, wherein the storage capacitor region includes a capacitor electrode region and an impurity injection region having an N-type impurity injection region and a P-type impurity injection region;

a first insulating layer on the TFT region and the storage capacitor region;

a gate electrode and a capacitor electrode on the first insulating layer;

a second insulating layer on the first insulating layer including the gate electrode and the capacitor electrode;

a passivation layer formed on the second insulating layer;

a contact hole passing through the first insulating layer, the second insulating layer, and the passivation layer to expose the N-type impurity injection region and the P-type impurity injection region of the impurity injection region; and a pixel electrode on the passivation layer and electrically connected to the N-type impurity injection region and the P-type impurity injection region of the impurity injection region through the contact hole.

* * * * *